US011982078B2

(12) United States Patent
Skrjanc et al.

(10) Patent No.: US 11,982,078 B2
(45) Date of Patent: May 14, 2024

(54) DRAIN CABLE DECOUPLER TOOLS

(71) Applicant: Ridge Tool Company, Elyria, OH (US)

(72) Inventors: Robert Skrjanc, Lorain, OH (US); Benjamin R. Azzam, Pittsburgh, PA (US); Scott Kruepke, Valley City, OH (US); Glen R. Chartier, Avon Lake, OH (US); Brandon Moherman, Sheffield Village, OH (US)

(73) Assignee: Ridge Tool Company, Elyria, OH (US)

( * ) Notice: Subject to any disclaimer, the term of this patent is extended or adjusted under 35 U.S.C. 154(b) by 601 days.

(21) Appl. No.: 17/114,634

(22) Filed: Dec. 8, 2020

(65) Prior Publication Data

US 2021/0087805 A1 Mar. 25, 2021

Related U.S. Application Data

(63) Continuation of application No. 16/211,331, filed on Dec. 6, 2018, now Pat. No. 10,889,976.

(60) Provisional application No. 62/652,387, filed on Apr. 4, 2018, provisional application No. 62/598,542, filed on Dec. 14, 2017.

(51) Int. Cl.
*B25B 27/14* (2006.01)
*E03F 9/00* (2006.01)

(52) U.S. Cl.
CPC .............. *E03F 9/005* (2013.01); *B25B 27/14* (2013.01)

(58) Field of Classification Search
CPC ................................ E03F 9/005; B25B 27/14
See application file for complete search history.

(56) References Cited

U.S. PATENT DOCUMENTS

| | | | | |
|---|---|---|---|---|
| D377,444 | S * | 1/1997 | Lin | D8/83 |
| 2010/0132143 | A1 | 6/2010 | Flamand | |
| 2015/0105163 | A1 | 4/2015 | Rutkowski et al. | |
| 2016/0245441 | A1 | 8/2016 | Klein et al. | |
| 2017/0197303 | A1 | 7/2017 | Szymusiak et al. | |
| 2020/0190786 | A1 | 6/2020 | Krondorfer et al. | |

FOREIGN PATENT DOCUMENTS

| | | | |
|---|---|---|---|
| CN | 1254635 | A | 5/2000 |
| CN | 101006622 | A | 7/2007 |
| CN | 104577496 | A | 4/2015 |
| CN | 206128212 | U | 4/2017 |
| DE | 198 52 385 | | 5/2000 |
| DE | 10 2014 220 29 | | 4/2015 |

(Continued)

OTHER PUBLICATIONS

Machine Translation of WO 01/18918. “Method for Producing Tools for Releasing Cable Joints and a Tool for Releasing Cable Joints” by Thomas Gress (Year: 2001).*

(Continued)

*Primary Examiner* — Nirvana Deonauth

(74) *Attorney, Agent, or Firm* — Mark Bandy; Rankin Hill & Clark, LLP

(57) ABSTRACT

Various decoupler tools are described for disengaging drain cleaning equipment couplings. Such couplings typically include a component secured at an end of a drain cleaning cable and a cutter or other accessory used in a drain cleaning operation. The decoupler tools include one or more pins which are used to retract a spring-actuated plunger in one of the coupling components.

21 Claims, 12 Drawing Sheets

(56) References Cited

FOREIGN PATENT DOCUMENTS

| | | |
|---|---|---|
| EP | 1214757 | 10/2005 |
| KR | 101158111 B | 7/2012 |
| WO | WO 0118918 | 3/2001 |

OTHER PUBLICATIONS

Chinese Office Action and Search Report dated Sep. 28, 2021; App. No. 2018800778809; 9 pg.
DE Office Action dated Feb. 20, 2023; App. No. 11 2018 006 391.7; 12 pages.
International Search Report and Written Opinion; PCT/US18/64162; Dec. 12, 2019; 12 pages.

* cited by examiner

DRAIN CABLE DECOUPLER TOOLS

CROSS REFERENCES TO RELATED APPLICATIONS

This application claims priority from U.S. nonprovisional application Ser. No. 16/211,331 filed Dec. 6, 2018, which claims priority upon U.S. provisional application Ser. No. 62/598,542 filed on Dec. 14, 2017; and U.S. provisional application Ser. No. 62/652,387 filed on Apr. 4, 2018.

FIELD

The present subject matter relates to drain cleaning equipment and particularly coupling assemblies associated with drain cleaning cables and tools.

BACKGROUND

Referring to FIG. 1, a leading end 1 of a drain cleaning cable 2 is typically connected to a tool 3, for example, a cutter tool, to aid in clearing a blockage within a drain line or pipe. In sectional drain cleaning applications, this cable end 1 is the end of the cable that is first inserted into the drain pipe. Cutter tools and other accessories are commonly connected to the drain cleaning cable 2 utilizing a coupling 5 having a plunger 6 that is fixed or otherwise secured at the leading end 1 of the cable 2. The plunger 6 is biased axially outward by a spring 9. The plunger 6 engages an opening 7 on the tool 3 to engage the tool with the cable, as shown in FIG. 1. Similarly, in sectional drain cleaning applications, multiple sections of drain cleaning cables are connected using a similar coupling having a spring-actuated plunger fixed at one end of a cable section to engage an opening in the opposite end of the next cable section to engage the cable sections together while in the drain and attacking the blockage.

To separate the cutter tool 3 from the coupling 5 and the end 1 of the lead cable 2 or separate sections of cable after use, a cable key pin 10, as depicted in FIG. 2, is typically used. The cable key pin 10 allows the user to insert a chamfered end 12 of a cylindrical member 14 into an access aperture 8 shown in FIG. 3 of the tool 3 or adjacent section of cable. Such insertion compresses the spring 9 in the coupling 5 and shifts the plunger 6 away from the opening 7 in the tool 3 or adjacent component. In order to shift the spring-actuated plunger 6, the cable key pin 10 must be inserted in the aperture 8 using a proper orientation that allows the wedge shape of the end 12 of the member 14 to compress the spring 9, utilizing a gap 16 between an end 6A of the plunger 6 and the access aperture 8. If the cable key pin 10 is inserted improperly, the wedge shaped end 12 will contact the outer surface of the plunger 6 instead of the end 6A, and further pushing force will not result in shifting the plunger 6 away from the tool 3. Upon proper insertion of the cable key pin 10 in the aperture 8, the wedge shape of the end 12 of the cable key pin 10 slides the spring-actuated plunger 6 inward and away from the tool 3. The spring-actuated plunger 6 will completely disengage the tool 3 or adjacent component, as the full diameter of the member 14 of the cable key pin 10 is positioned between the plunger end 6A and the aperture 8, thereby increasing the spring compression.

When the cable key pin 10 is fully inserted through the tool 3 and the spring-actuated plunger 6 is fully retracted, the cutter tool 3 or adjacent cable section can then be disengaged from the adjacent component. The user can then remove their hand from the cable key pin 10 and use manual hand force to slide the two components, for example the tool 3 and the cable coupling 5, apart as shown in FIG. 4. As depicted in FIG. 4, the cable coupling 5 and the cutter tool 3 include provisions to radially and slidably engage the coupling assembly apart along opposing faces of the coupling 5 and the cutter tool 3 or other mating component.

The system described above, typically requires the user to remove their hand from the cable key pin 10 in order to obtain the proper leverage for easily separating sections of cable or a cutter from the cable. This requires additional time to complete, and the sliding motion required to separate the components is difficult to maneuver by hand. This difficulty is increased as dirt and debris accumulate onto the cable, as well as after corrosion has developed on the sliding surfaces of the coupling and the tool or adjacent cable section.

Accordingly, a need exists for a new strategy and assembly for disengaging couplings of drain cleaning cables.

SUMMARY

The difficulties and drawbacks associated with previous approaches are addressed in the present subject matter as follows.

In one aspect, the present subject matter provides a decoupler tool comprising a handle, a first pin extending from the tool handle, and a second pin extending from the tool handle. A distal end of the first pin is tapered.

In another aspect, the present subject matter provides a decoupler tool comprising a base having a first outwardly extending member and a second outwardly extending member spaced from the first member to thereby define a receiving region between the first member and the second member. The decoupler tool also comprises a primary pin extending from the base and disposed within the receiving region. The primary pin defines a distal end, wherein the distal end of the primary pin is tapered. The decoupler tool also comprises a cam face extending from the first member toward the base.

In yet another aspect, the present subject matter provides a system for selectively disengaging a drain cleaning cable coupling and a mating component. The system comprises a drain cleaning cable coupling. The coupling includes an axially displaceable plunger biased to extend axially outward. The system also comprises a mating component. The mating component includes provisions to radially and slidably engage the coupling along opposing faces of the coupling and the mating component. The mating component defines an aperture that provides radial access to a distal end of the plunger upon engagement between the coupling and the mating component and axial extension of the plunger. The system also comprises a decoupler tool including a tool handle, a first pin extending from the tool handle, and a second pin extending from the tool handle, wherein the first pin is sized and shaped to enable the first pin to be inserted within the aperture of the mating component.

In still another aspect, the present subject matter provides a system for selectively disengaging a drain cleaning cable coupling and a mating component. The system comprises a drain cleaning cable coupling. The coupling includes an axially displaceable plunger biased to extend axially outward. The system also comprises a mating component. The mating component has provisions to radially and slidably engage the coupling along opposing faces of the coupling and the mating component. The mating component defines an aperture that provides radial access to a distal end of the plunger upon engagement between the coupling and the mating component and axial extension of the plunger. The system also comprises a decoupler tool including a base having a first outwardly extending member and a second outwardly extending member spaced from the first member to thereby define a receiving region between the first member and the second member, and a primary pin extending from the base and disposed within the receiving region. The primary pin defines a distal end. The distal end of the primary pin is tapered. The decoupler tool also includes a cam face extending from the first member toward the base.

In yet another aspect, the present subject matter provides a method for selectively disengaging a drain cleaning cable coupling and a mating component. The coupling includes an axially displaceable plunger biased to extend axially outward. The mating component defines an aperture that provides radial access to a distal end of the plunger upon engagement between the coupling and the mating component and axial extension of the plunger. The method comprises providing a coupling engaged to the mating component and providing a decoupler tool including a handle, a first pin, and a second pin. The method also comprises inserting the first pin of the tool into the aperture of the mating component. The method also comprises rotating the tool about the first pin until the second pin contacts the coupling. The method also comprises further rotating the tool about the first pin so that the coupling and the mating component are displaced relative to each other. The method further comprises continuing rotation of the tool about the first pin until the coupling and the mating component are disengaged from each other.

In another aspect, the present subject matter also provides a method for selectively disengaging a drain cleaning cable coupling and a mating component. The coupling includes an axially displaceable plunger biased to extend axially outward. The mating component defines an aperture that provides radial access to a distal end of the plunger upon engagement between the coupling and the mating component and axial extension of the plunger. The method comprises providing a coupling engaged to the mating component and providing a decoupler tool including a base having a first outwardly extending member and a second outwardly extending member spaced from the first member to thereby define a receiving region between the first member and the second member, a primary pin extending from the base and disposed within the receiving region, the primary pin defining a distal end, wherein the distal end of the primary pin is tapered, and a cam face extending from the first member toward the base. The method also comprises inserting the primary pin of the decoupler tool into the aperture of the mating component. The method also comprises moving the coupling engaged to the mating component toward the base of the decoupler tool. The method further comprises contacting the mating component with the cam face of the decoupler tool. And, the method also comprises further moving the coupling engaged to the mating component toward the base of the decoupler tool until the coupling and the mating component are disengaged from each other.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter applies to sectional drain cleaning cable equipment and operations such as separating, i.e. decoupling, sections of cable or separating a lead cable and a cutter tool or other accessory. The present subject matter could apply to drain cleaning cable and/or related equipment available under the RIDGID designation or other manufacturers of drain cleaning cable that utilize similar attachment methods between cable sections and/or between a lead cable and a cutting tool or accessory. The present subject matter also applies to nearly any cable size, i.e., diameter, and/or variation of such products. The present subject matter could further apply to separating drum drain cleaning cables. In this case, the present subject matter would apply to decoupling the cable from the cutter tool used for clearing the drain blockage. These and other aspects are described in greater detail herein.

Generally, the applicable field for the present subject matter is disengagement assemblies, tools, and methods relating to disengaging drain cleaning cable(s). The various embodiments of the drain cleaning decoupler tools detailed herein provide greater flexibility in use for accommodating multiple drain cleaning cable sizes. In this way, all sectional drain cables available under the RIDGID designation and some drum drain cables are contemplated as each share common end couplings, for example ⅜" drum cable uses the ⅝" sectional cable coupling; ½" drum cable uses the ⅞" sectional cable coupling.

The present subject matter provides tools, systems, and related strategies that more efficiently separate sectional drain cleaning cable coupling assemblies as compared to currently known tools and practices. The present subject matter is achieved by utilizing a decoupler or decoupling tool comprising two parallel cylindrical members or pins, having a specific configuration and spacing between their axes, that function to individually move the spring-actuated plunger away from the coupling joint, via a primary pin; and to displace the two coupling components apart, via a secondary pin, as shown in the referenced figures.

Figure 1:
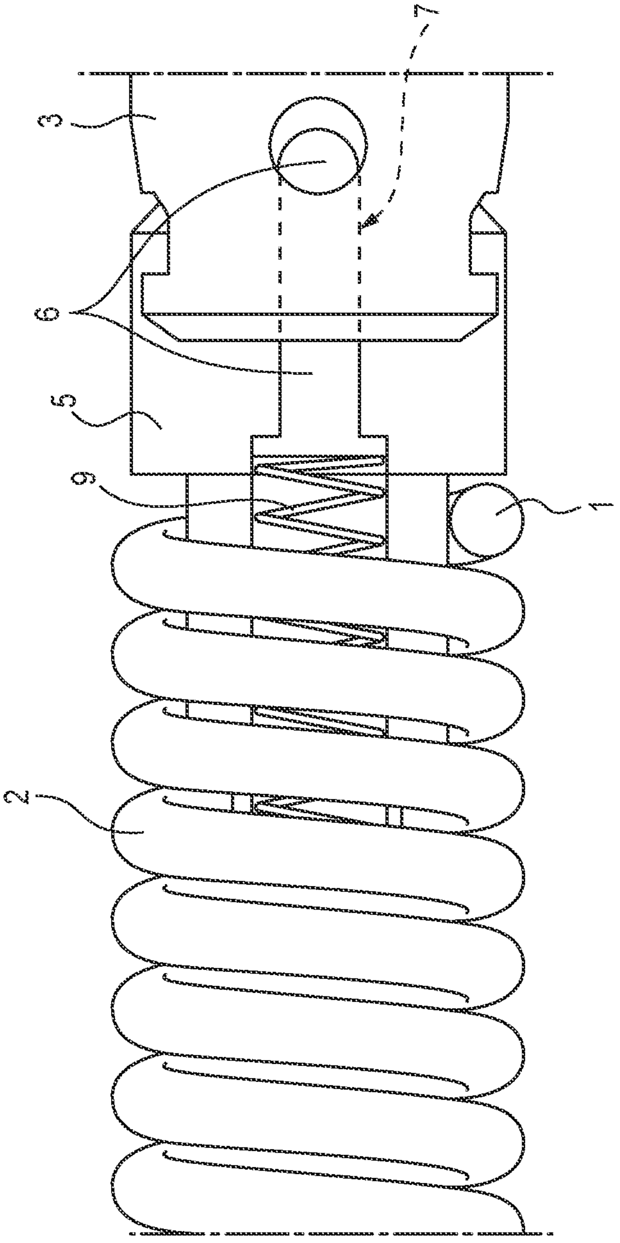
FIG. 1 (PRIOR ART)
FIG. 1 is a schematic view of an end of a drain cleaning cable having a spring-actuated plunger and a tool with an engagement opening for linking or coupling to the cable end and the plunger.
Figure 2:
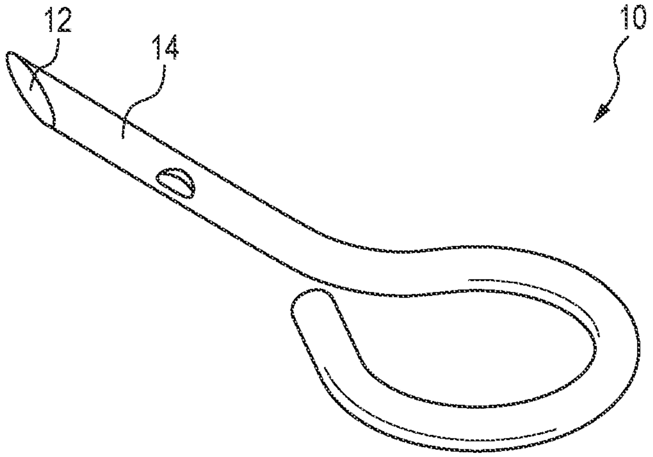
FIG. 2 (PRIOR ART)
FIG. 2 is a schematic perspective illustration of a typical cable key pin used for disengaging the plunger in the assembly of FIG. 1.
Figure 3:
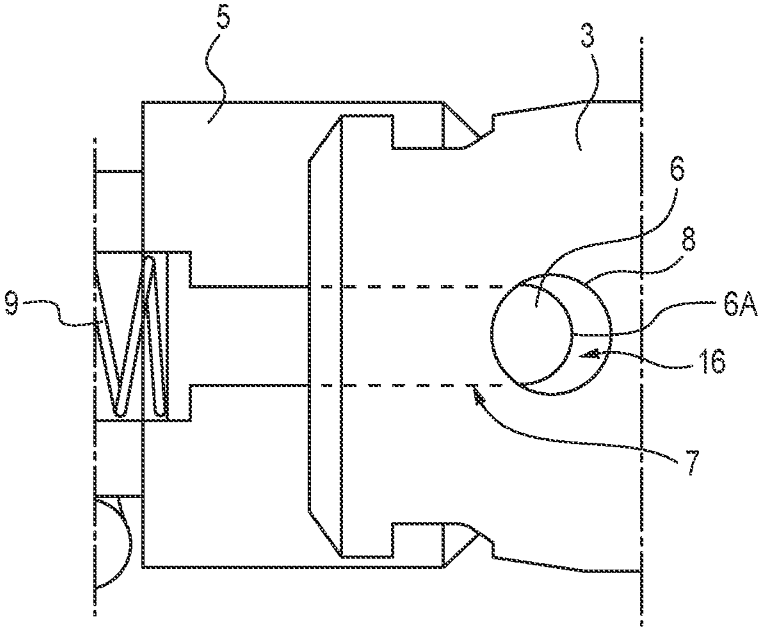
FIG. 3 (PRIOR ART)
FIG. 3 is a detail schematic view of the assembly of FIG. 1 showing a state in which disengagement will not occur due to insufficient retraction of the plunger and/or improper insertion of a cable key pin.
Figure 4:
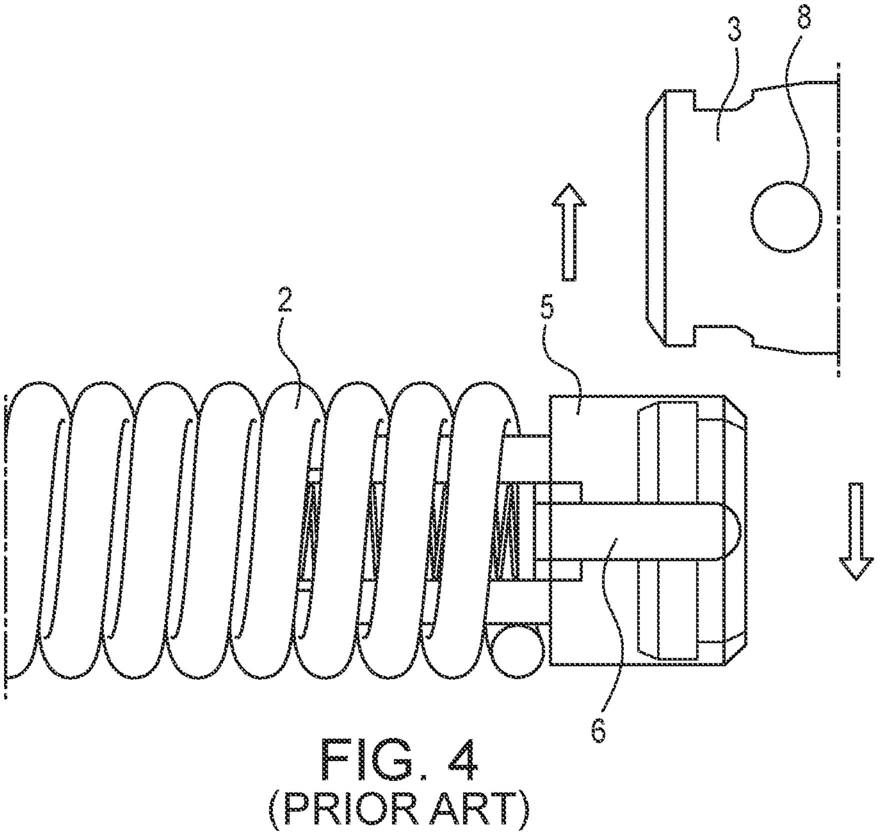
FIG. 4 (PRIOR ART)
FIG. 4 is a schematic illustration of the assembly depicted in FIG. 1, showing full retraction of the plunger and disengagement between the cable and tool.
Figure 5:
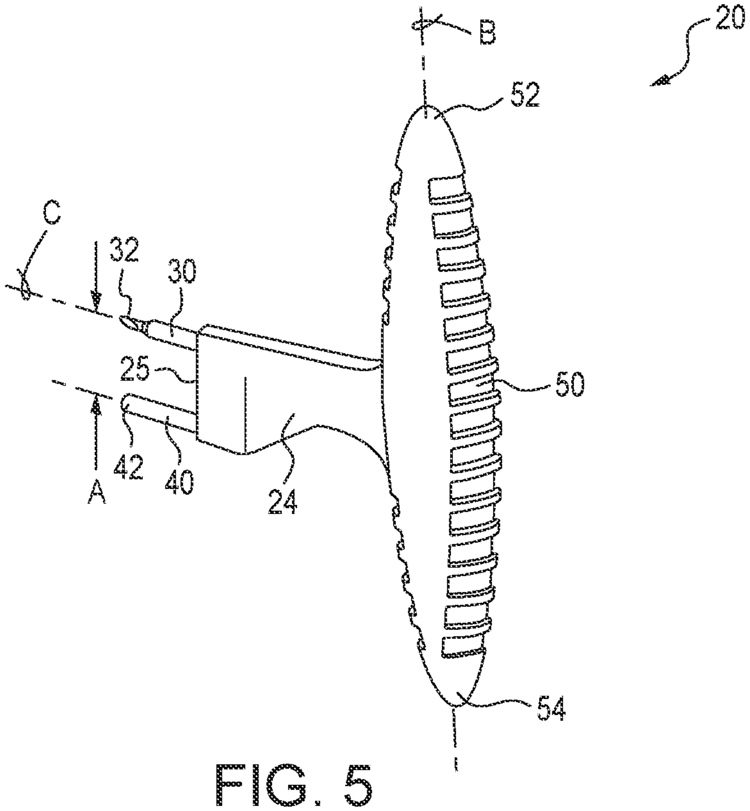
FIG. 5 is a perspective schematic view of an embodiment of a decoupler tool in accordance with the present subject matter.

FIG. 5 is a perspective schematic view of a decoupler tool 20 in accordance with an embodiment of the present subject matter. The tool 20 comprises a tool body 24 having a distal tool face 25 and disposed at an opposite end or substantially so, a handle 50. Extending from the tool face 25 are a plurality of pins such as a first or primary pin 30 and a second or secondary pin 40. The first pin 30 defines a distal end 32 which in many versions is tapered, wedge-shaped, conical, or chamfered. The term "tapered" as used herein includes any configuration in which the cross sectional span or diameter of the pin generally decreases toward the distalmost end of the pin. The distal end 42 of the second pin 40 is typically flat or blunt, however, could be in the form of a wide array of different shapes. The distal end 42 of the second pin 40 could have the same shape or a different shape than the distal end 32 of the first pin 30. In many versions of the tool 20, the first pin 30 and the second pin 40 extend parallel to each other. The tool 20 utilizes a particular spacing between the first and second pins 30 and 40. This spacing is shown in FIG. 5 as distance A. This spacing is described in conjunction with other referenced figures. It will be understood that the decoupler tool 20 can include more than two pins.

The tool 20 can also comprise an enlarged portion of the tool body 24 or a handle 50 for example to promote gripping of the tool by a user. The handle 50 can be in a variety of shapes and sizes. In many versions, the handle 50 is in the form of a longitudinal member having opposite ends 52, 54. In certain versions, the handle 50 extends along an axis that is perpendicular or substantially so, to the axes of one or both of the first and second pins 30, 40. This configuration is depicted in FIG. 5 in which a longitudinal axis B of the handle 50 is transverse to an axis C of the first pin 30.

Figure 6:
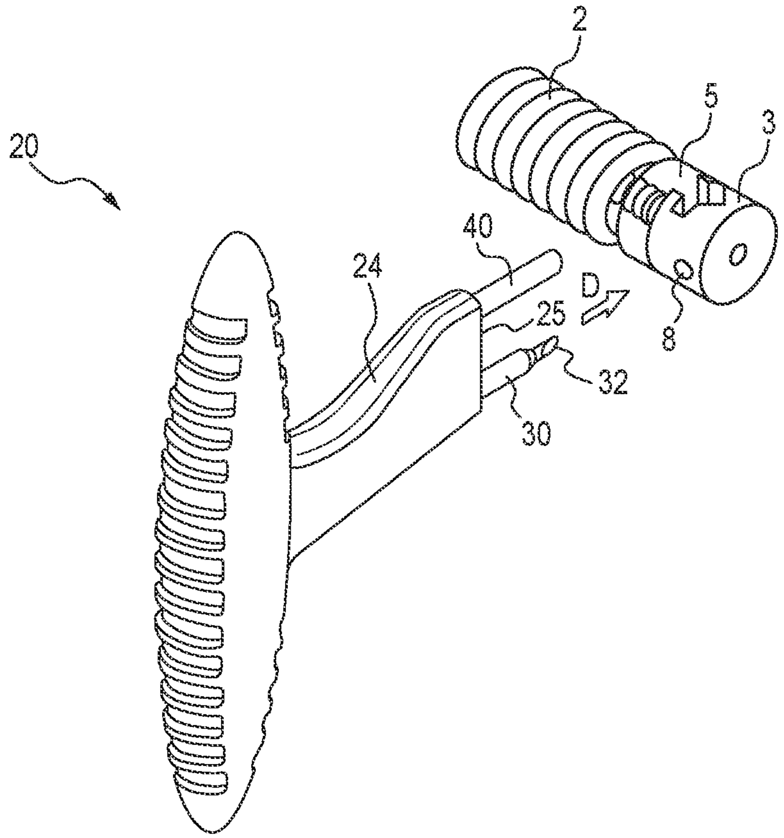
FIG. 6 is a perspective view of the tool of FIG. 5 aligned for insertion in a drain cleaning cable coupling assembly.
Figure 7:
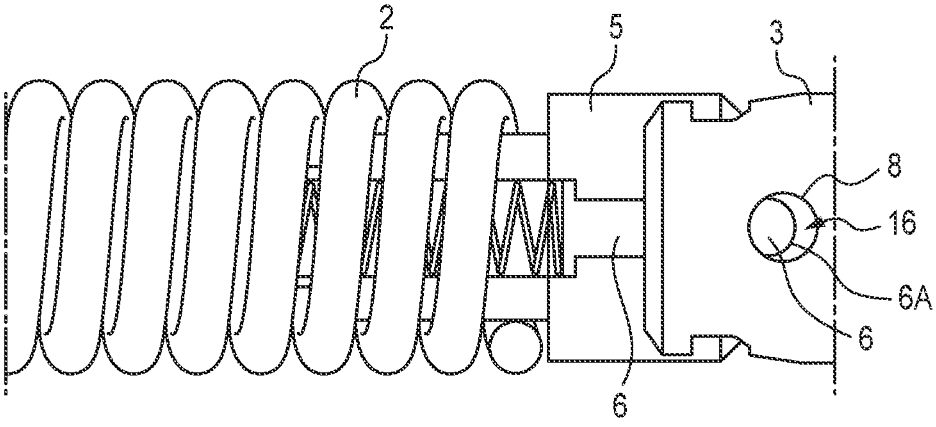
FIG. 7 is a detailed schematic view illustrating a state of the coupling assembly prior to tool insertion.

To achieve separation between a coupling having a spring-biased plunger and a tool or adjacent section of cable, the primary pin of the decoupler tool utilizes a feature to aid inserting the pin in the gap between the spring-actuated plunger and the engagement aperture in the mating cable or cutter tool. This feature is achieved by using a particular size and shape cross section of the primary pin that allows the pin to be completely inserted from various rotational orientations due to its reduced cross sectional area. Specifically, referring to FIGS. 6 and 7, in order to disengage the coupling 5 from the cutter tool 3, the decoupler tool 20 is positioned such that the tool face 25 is directed toward the coupling 5 and cutter tool 3, and particularly toward the aperture 8 in the cutter tool 3. The distal end 32 of the first pin 30, which is tapered, is inserted into the aperture 8 and within the gap 16 between the end 6A of the plunger 6 and an interior of the wall of the aperture 8. Upon initial insertion of the distal end 32 of the pin 30 within the gap 16, the user then further moves the tool 20 toward the cutter tool 3, i.e., in the direction of arrow D, until the tool face 25 contacts the cutter tool 3 or nearly so.

Figure 8:
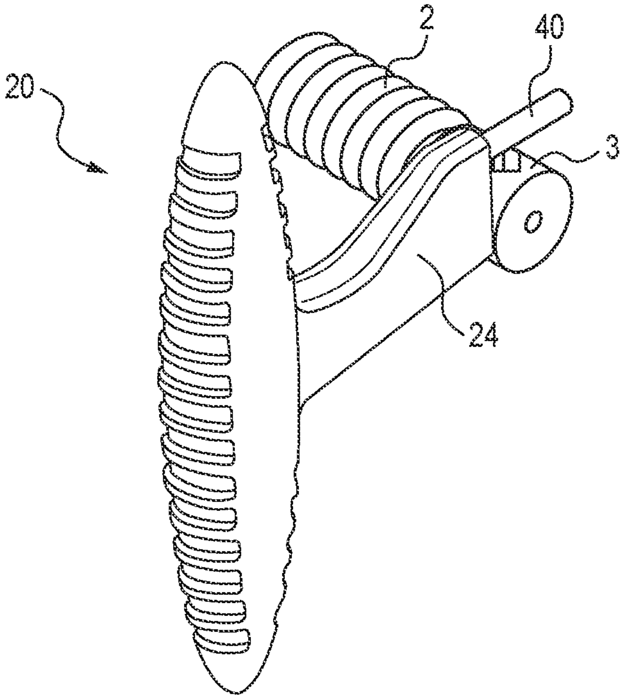
FIG. 8 is a perspective view of the tool and coupling assembly of FIG. 6 after insertion of the tool.
Figure 9:
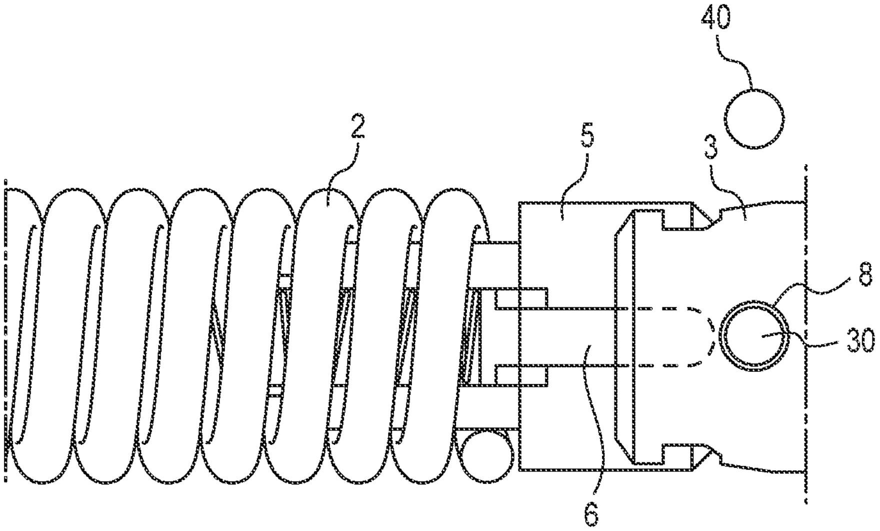
FIG. 9 is a detailed schematic view illustrating a state of the coupling assembly after tool insertion.

Using the primary pin, the spring-actuated plunger is retracted or otherwise moved into the cable body, leaving the cutter tool free from plunger engagement. Specifically, FIG. 8 illustrates the decoupler tool 20 fully inserted within the aperture 8 of the cutter tool 3. In this position, the second pin 40 extends along an outer region of the cutter tool 3. FIG. 9 illustrates positioning of the first pin 30 within the aperture 8, and after retraction or further displacement of the plunger 6 into the coupling 5 and away from the cutter tool 3.

Figure 10:
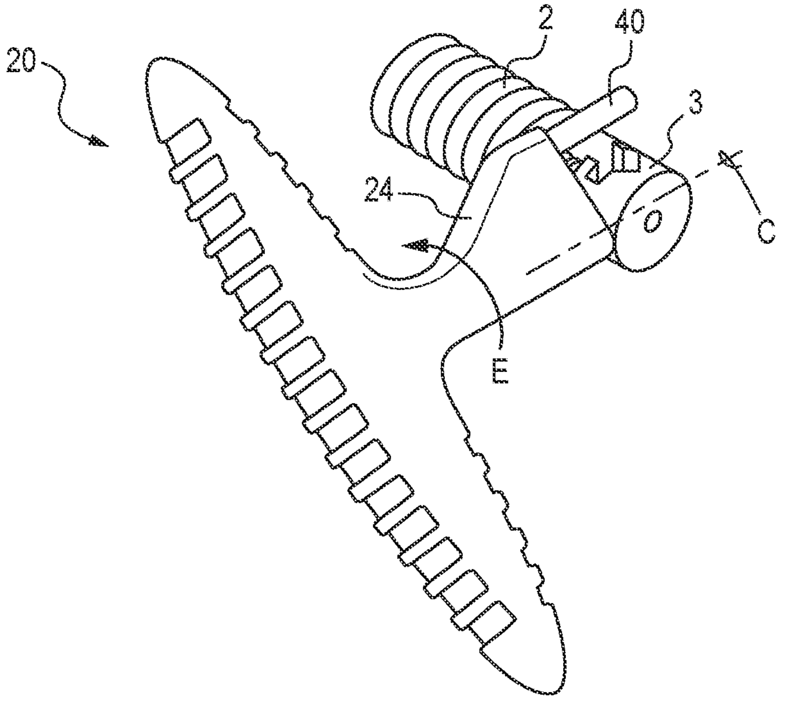
FIG. 10 is a perspective view of the tool and coupling assembly of FIGS. 6 and 8 after insertion and pivoting of the tool.
Figure 11:
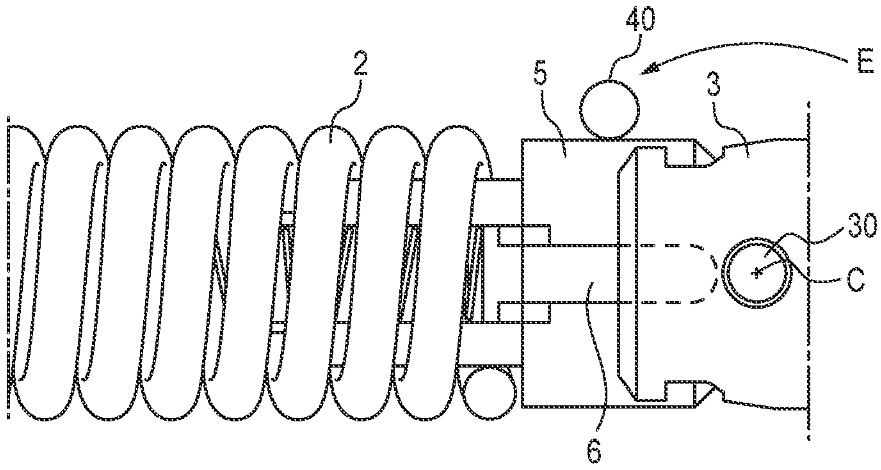
FIG. 11 is a detailed schematic view illustrating. a state of the coupling assembly after tool pivoting.

The decoupler tool is then rotated about the primary pin which serves as a pivot point until the secondary pin contacts the cable coupling of the cable with the integrated spring-actuated plunger. In many embodiments, the present subject matter requires the spacing between the primary and secondary pins to be adequate to contact the coupling of the cable and not the coil of the cable. In many embodiments, the present subject matter also requires the spacing between the primary and secondary pins be adequate to ensure that the secondary pin avoids contact with the cutter tool. And thus, this spacing requires that the secondary pin must clear the edge of the cutter tool during rotation of the decoupler tool. Referring to FIGS. 10 and 11, upon full insertion of the decoupler tool 20 into the cutter tool 3, the decoupler tool 20 is then rotated in the direction of arrow E about the axis of the first pin 30 such that the second pin 40 is brought into contact with the coupling 5. This movement is shown in FIGS. 10 and 11 as pivoting or rotational movement of the decoupler tool 20 about the axis C of the first pin 30.

Figure 12:
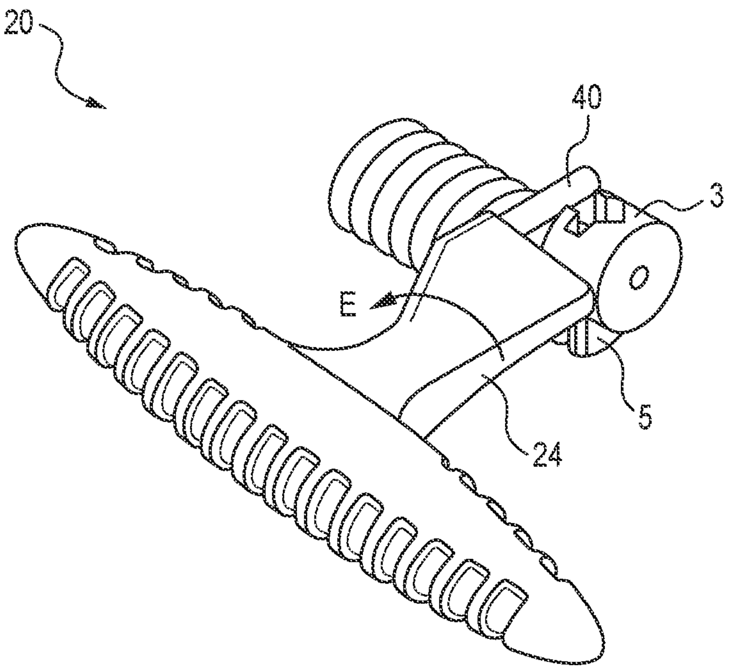
FIG. 12 is a perspective view of the tool and coupling assembly of FIGS. 6, 8, and 10 after insertion, pivoting, and further rotation of the tool.
Figure 13:
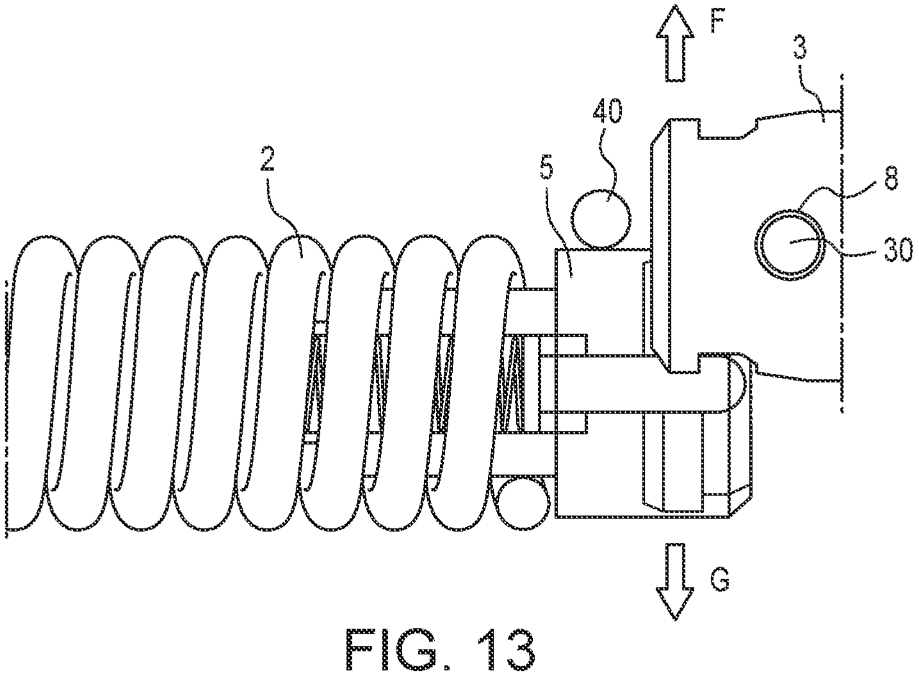
FIG. 13 is a detailed schematic view illustrating a state of the coupling assembly after further rotation of the tool and initial disengagement.

As the tool is further rotated in this manner, force applied via the secondary pin against the coupling slides the coupling joint apart, as shown in FIG. 12 and FIG. 13. This results in complete disengagement between the cable 2/coupling 5 and the tool 3. Specifically, as decoupler tool 20 is rotated about pin 30 in the direction of arrow E, the second pin 40 contacts the coupling 5 and urges the coupling 5 in the direction of arrow G, and/or such rotation also causes the first pin 30 disposed in aperture 8 of the tool 3, to urge the tool 3 in the direction of arrow F.

Figure 14:
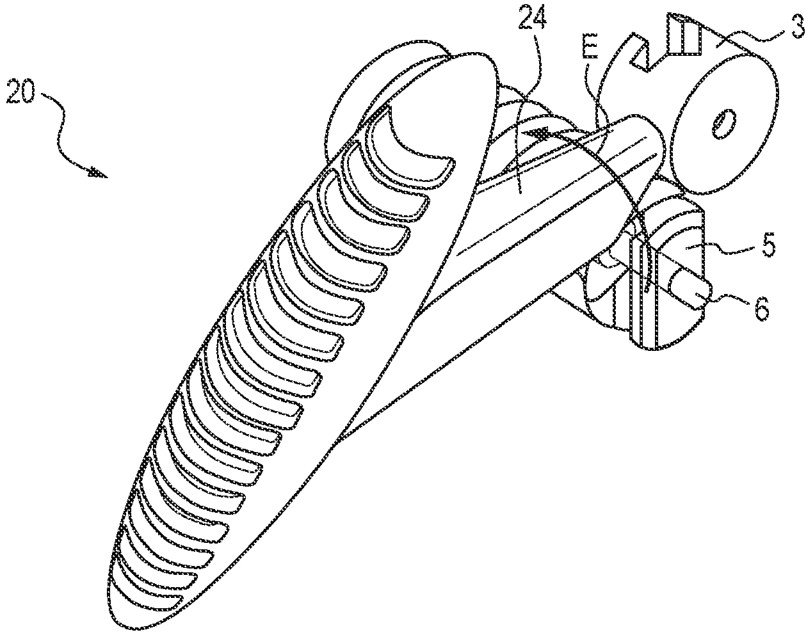
FIG. 14 is a perspective view of the tool and coupling assembly of FIGS. 6, 8, 10, and 12 after insertion, pivoting, further rotation, and full rotation of the tool.
Figure 15:
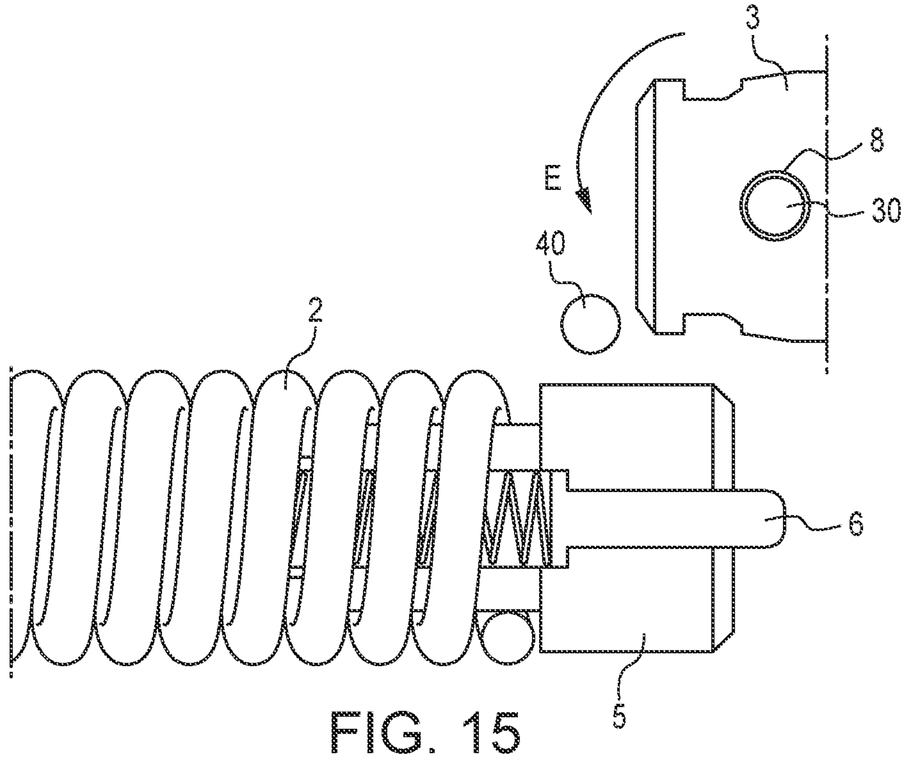
FIG. 15 is a detailed schematic view illustrating a state of the coupling assembly after full rotation of the tool, and complete disengagement of the coupling assembly.

With the decoupler tool rotated further, the joint becomes completely separated and the coupling components, i.e., coupling 5 and tool 3, freed from each other, thereby completing the process of separating the cables or the cable and the cutter tool, as shown in FIG. 14 and FIG. 15. Specifically, rotation of the tool 20 about the first pin 30 in the direction of arrow E, results in full separation of the tool 3 and the coupling 5. The decoupler tool 20 remains with the tool 3 due to insertion of the first pin 30 in the aperture 8 of the tool 3. The decoupler tool 20 can then be withdrawn from the tool 3.

Figure 16:
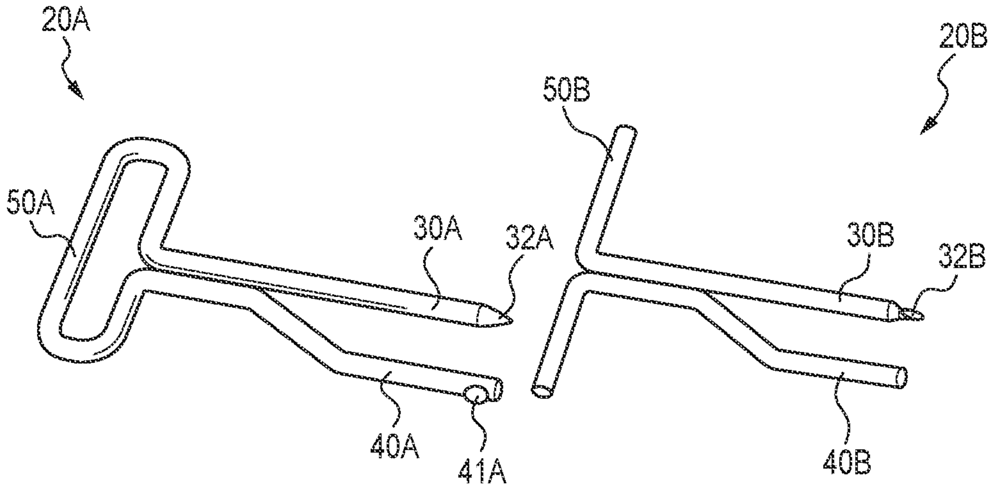
FIG. 16 illustrates additional embodiments of decoupling tools in accordance with the present subject matter.

The present subject matter decoupler tools feature the use of two pins to perform a function of depressing the spring-actuated plunger and another function of shifting apart the cable coupling components, i.e., the coupling 5 and the tool 3, to achieve complete separation. This can be accomplished for example with two separately mounted pins, a weldment of two pins, and/or a loop of continuous pin material formed to create the proper spacing between pins, as depicted in FIG. 16. For example, decoupler tool 20A comprises a handle 50A and two pins 30A and 40A extending therefrom. The first pin 30A defines a distal end 32A. At least the distal portions of the pins 30A and 40A are parallel to each other. Decoupler tool 20B comprises a handle 50B and two pins 30B and 40B extending therefrom. The first pin 30B defines a distal end 32B. At least the distal portions of the pins 30B and 40B are parallel to each other. Alternatively or in addition, the tools can include a molded polymeric handle with an ergonomic grip as illustrated in the previously referenced figures, but such grip is not required for the present subject matter. It is also contemplated that the handle could be formed from a combination of polymeric material(s) and one or more metals. It will be understood that the present subject matter includes a wide array of handle configurations and materials. If the handle is formed from metal, aluminum has been found to be useful due to its low weight and high strength characteristics.

The present subject matter includes tools having two pins with the same end profile/geometry or pins with different end profiles as described herein. Thus, in certain embodiments of the tools, the distal end of the second pin may be the same or different than the distal end of the first pin.

The present subject matter decoupler tools can additionally use a larger feature on the secondary pin that prevents the user from inadvertently inserting the secondary pin into the access aperture 8 of the tool or coupling, which would not result in axial movement of the spring-actuated plunger 6. For example, the second pin could exhibit a larger cross sectional area than the first pin and/or feature a cross sectional area or shape that precludes insertion of the second pin into the aperture 8 of the tool 3 or adjacent cable section. Instead of utilizing a larger cross section for the second pin, it is also contemplated that the second pin could include one or more projections or regions extending outward from the second pin so as to prevent insertion of the second pin into the noted aperture. For example, FIG. 16 illustrates the secondary pin 40A of the decoupler tool 20A having a projection 41A as noted.

Figure 17:
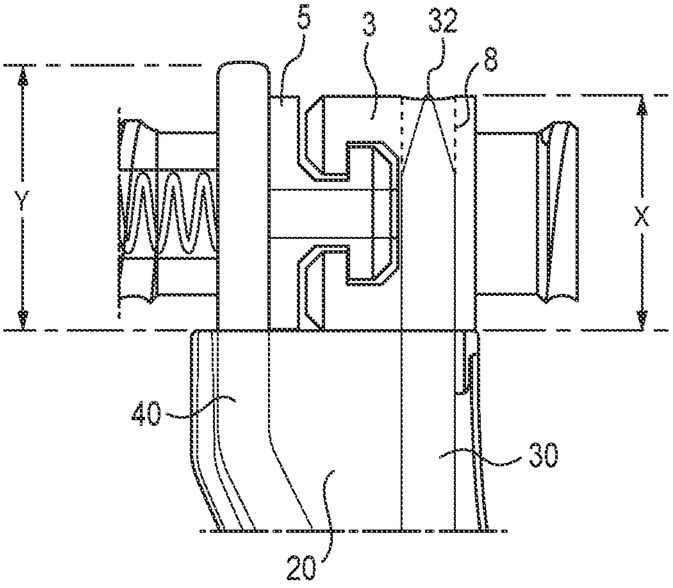
FIG. 17 is a schematic detail cross sectional view of a coupling assembly and tool inserted therein, showing an alternate configuration for the decoupling tool in accordance with the present subject matter.

Additionally, the present subject matter decoupler tools could feature a longer secondary pin as compared to the length of the primary pin to protect the smaller cross sectional area tip or distal end of the primary pin, as shown in FIG. 17. Specifically in this version, the length of the second pin 40 of the decoupler tool 20 is shown in FIG. 17 as length Y. The length of the first pin 30 is shown as length X. In this version of the tools, Y is greater than X. This is not critical to the function of the tools of the present subject matter and variations are contemplated.

To further protect the primary pin from damage during use, the working length of the primary pin is configured to extend no further than the body of the cable coupling so that, when completely inserted, the tip or distal end of the primary pin cannot contact any outside components and become damaged. This configuration is also shown in FIG. 17. Specifically, in this configuration, upon full insertion of the first pin 30 into the access aperture 8, the distal end 32 of the first pin 30 is flush or substantially so, with an exterior or outer surface of the tool 3.

In certain versions, the distal end of the primary pin features a reduced cross section for easier insertion into the gap between the spring-actuated plunger tip and the adjacent coupling. The geometry of this configuration can take many forms, but a conical profile is preferred in particular versions as it provides the ability for the primary pin to be inserted from any rotational orientation that the operator chooses to use as depicted in FIG. 17.

Figure 18:
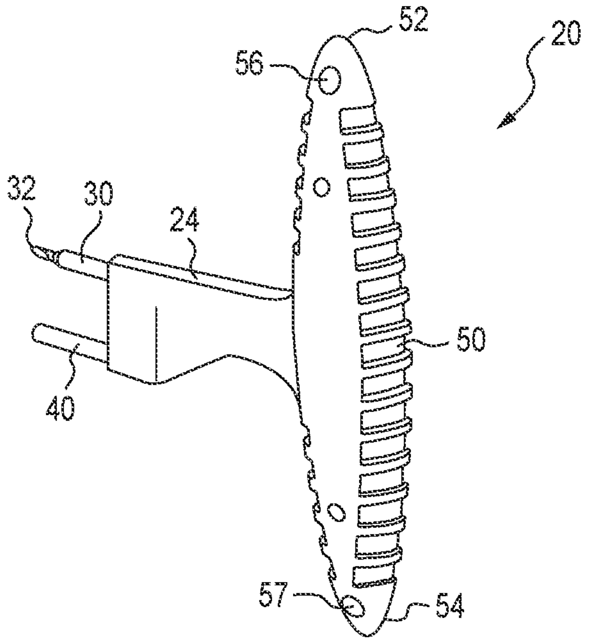
FIG. 18 is a perspective view of an embodiment of a decoupling tool having keychain(s) aperture in accordance with the present subject matter.

An additional feature for this tool is the use of an integrated keychain aperture that allows tethering the decoupler tool to another component, piece of equipment or to the user's clothing to reduce the possibility of misplacement or loss, as shown in FIG. 18. Specifically, FIG. 18 illustrates a decoupler tool 20 having a handle 50 with a plurality of keychain apertures. A first keychain aperture 56 is provided at or near the first handle end 52, and a second keychain aperture 57 is provided at or near the second handle end 54.

Figure 19:
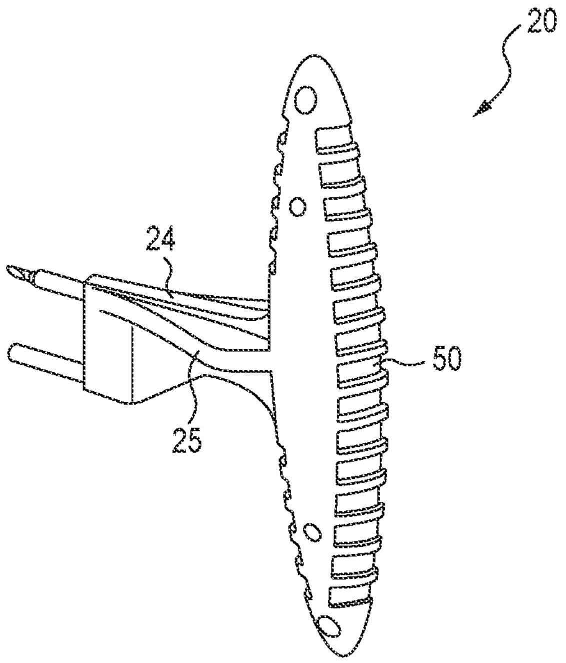
FIG. 19 is a perspective view of another embodiment of a decoupling tool having an enlarged handle section in accordance with the present subject matter.

The decoupler tools of the present subject matter may additionally feature a component for cleaning debris and drain blockage remnants from the windings of the cable. This feature could be inserted through the cable coils and the tool moved to pick or scrape at the debris. This function could be achieved through use of the primary or secondary pin, or with a dedicated cleanout feature incorporated or otherwise provided on the tool. Another additional feature for this tool is an area intended for tapping coupling joints, i.e. a hammer face. A feature that allows the user to tap cable couplings could be used by the operator to force two coupling components together or to confirm that a proper connection has been made after attachment, ensuring that separation will not inadvertently occur when the coupling assembly is located in the drain. Another additional feature for the tools of the present subject matter is an enlarged section of the handle to promote separation of the tool from the ground when set down, thereby easing the ability of the user to grasp the tool, especially when wearing gloves as is typical for drain cleaning professionals. FIG. 19 illustrates a raised ridge or region 25 generally extending laterally outward from the body 24 that can serve or function in one or more of the previously noted manners, i.e., as a scraper tool, as a tapping tool, and/or as a grip-promoting component.

Figure 20:
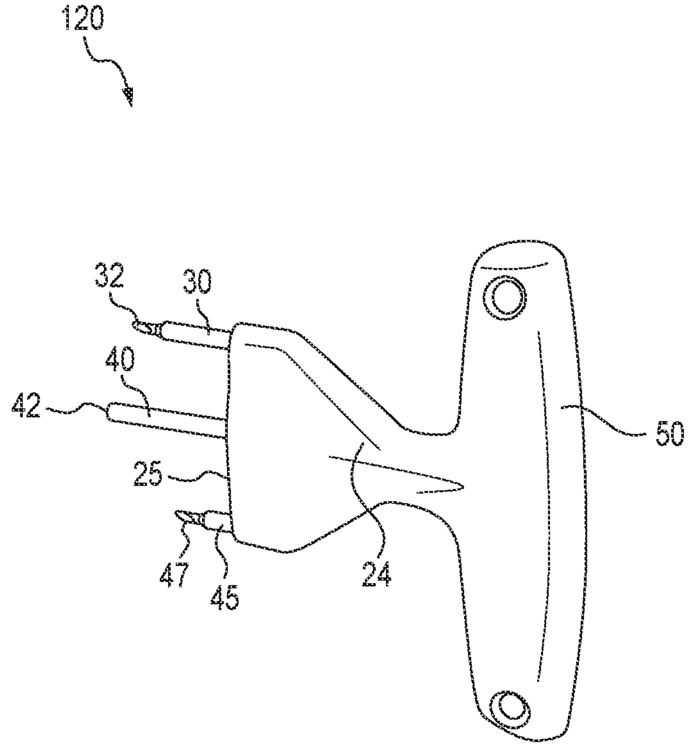
FIG. 20 is a perspective schematic view of another embodiment of a decoupler tool in accordance with the present subject matter.

In yet another embodiment, the present subject matter provides a decoupler tool having three (3) pins. FIG. 20 illustrates a decoupler tool 120 having a tool body 24 with a distal tool face 25 and a handle 50. Extending from the tool face 25 are a large primary pin 30, a secondary pin 40, and a small primary pin 45. The primary pin 30 defines a distal end 32 which in many versions, is tapered as described herein. The secondary pin 40 defines a distal end 42. The other primary pin 45 defines a distal end 47 which in many versions, is tapered as described herein. The distal end 42 of the secondary pin 40 is typically flat or blunt, but could be in a wide array of different shapes. The distal end 42 of the secondary pin 40 could have the same shape or a different shape than the distal end 32 of the primary pin 30 and/or the distal end 47 of the other primary pin 45. In many versions of the tool, two or more, and in certain versions all three, of the pins 30, 40, and/or 45 extend parallel to each other. The tool 120 utilizes a particular spacing between the pins 30 and 40, and/or between the pins 40 and 45, as described herein the regard to the decoupler tool 20.

The general features and use of the tool 120 are as previously described with regard to the decoupler tool 20. However, in the decoupler tool 120, the addition of the smaller primary pin 45 enables the tool 120 to be used with different cable sizes. The larger primary pin 30 is typically larger in both diameter and length as compared to the small primary pin 45, and is for use with relatively large cable sizes, for example ⅞ inch and 1¼ inch. The smaller primary pin 45 is for use with ⅝ inch cable, for example. Each primary pin 30 and 45 is configured for use with a particular cable size such that the diameter, length, and distal end profile are selected for performance with the particular cable. The secondary pin 40 is disposed between the two primary pins 30 and 45.

Using the decoupler tool 120, a user positions the appropriate primary pin 30 or 45 through the cable coupling to depress the spring-actuated plunger as described herein. The decoupler tool 120 is then rotated such that the secondary pin 40 contacts the opposite side of the coupling joint and rotated further through the connection to thereby separate the coupling components. The function with either the small or large primary pin is the same to the user, and the common secondary pin always creates the separation. As previously described herein, the secondary pin can be of larger diameter to prevent inadvertent placement of it into the spring-loaded plunger access hole of the coupling.

Alternatively, this common decoupler function could be achieved by mounting a separate primary pin/secondary pin couple at a different position on the tool. Likewise, rotating or sliding action of the second primary pin could be incorporated to achieve the storage and positioning of the pins for use.

Figure 21:
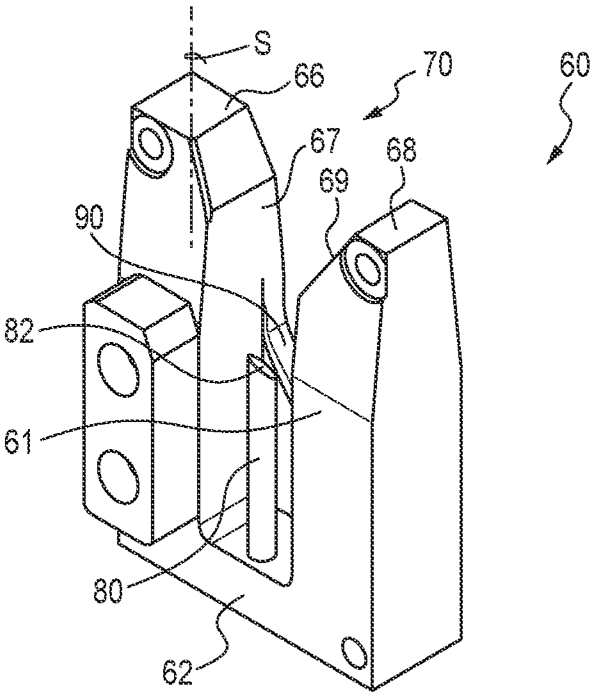
FIG. 21 is a schematic perspective front view of another decoupling tool in accordance with the present subject matter.
Figure 22:
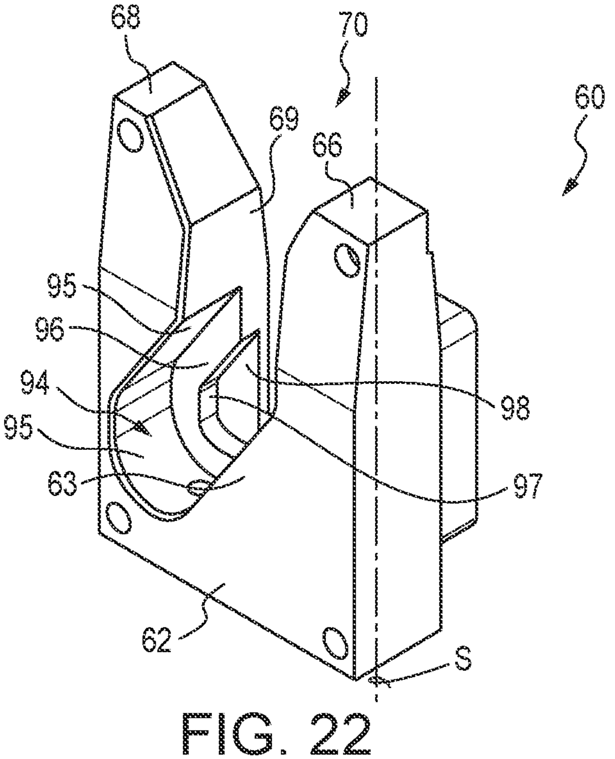
FIG. 22 is a schematic perspective rear view of the decoupling tool of FIG. 21.

In still another embodiment, the present subject matter provides a stationary decoupler tool. In this embodiment, the decoupler function can be achieved by utilizing a stationary fixture featuring a pin with a wedge shaped or tapered end tip similar to the previously described decoupler tool 20, a straight guide, and an offset guide, as shown in FIG. 21 and FIG. 22. By inserting the cable coupling joint into the fixture and aligning the pin with the engagement opening in the drain cable coupling assembly, the spring-actuated plunger can be retracted. Further pushing the joint through the fixture achieves the following. The spring-actuated plunger remains retracted due to the length of the wedge-tipped pin. The cutter tool or cable section to be separated follows the contour of the straight guide. And the cable coupling the spring-actuated plunger follows the contour of the offset guide. The profiles of the straight and offset guides result in relative sliding motion between the coupling components, thereby completing the separation of the coupling assembly when finished.

Specifically, this embodiment of a decoupler tool 60 is shown in FIGS. 21 and 22. These figures show front and rear views of the tool 60, respectively. The tool 60 comprises a base 62 having a first outwardly extending member 66 and a second outwardly extending member 68. The members 66 and 68 are spaced apart from each other to define a receiving region 70 between the members, and specifically between an inner face 67 of the first member 66 and an inner face 69 of the second member 68. In certain versions of the decoupler tool 60, the members 66, 68 may extend parallel to each other. However, the present subject matter includes versions in which the members 66, 68 are not parallel to each other.

The decoupler tool 60 also comprises a primary pin 80 extending from the base 62 and located generally between the first and second members 66, 68. The primary pin 80 is generally disposed within the noted receiving region 70 defined by the members 66, 68. In many versions of the decoupler tool 60, the primary pin 80 is parallel or substantially so, to the longitudinal axes of one or both of the first and second members 66, 68. However, it will be appreciated that the present subject matter includes versions in which the primary pin 80 is not parallel to one or both of the members 66, 68.

The primary pin 80 defines a distal end 82. The shape of the distal end 82 is typically tapered as previously described herein regarding the distal end 32 of the primary pin 30 of the decoupler tool 20.

The decoupler tool 60 also comprises a cam face 90 extending from member 66 or the second member 68. In the embodiment depicted in FIGS. 21 and 22, the cam face 90 extends from an inner face 67 of the first member 66 toward the second member 68. The cam face 90 is generally disposed within the receiving region defined between the members 66, 68.

The cam face 90 is typically flat or substantially so. However, the present subject matter includes arcuate shapes and/or complex geometries for the cam face 90. The cam face 90 extends toward the base 62 from the inner face 67 of the first member 66. Typically, the cam face 90 extends at an angle from a longitudinal axis of the first member 66 shown in FIG. 21 as axis S, in which the angle is within a range of from about 110° to about 160°, preferably from 120° to 150°, and more particularly about 135°.

In particular versions of the decoupler tool 60, the cam face 90 extends from the inner face 67 of the first member 66 at a location that is generally the same distance from the base 62 as the distance between the distal end 82 of the primary pin 80. However, the present subject matter includes a wide array of variant configurations and arrangements of components.

The decoupler tool 60 may in certain versions include a harbor region 94 for receiving a portion of the drain cleaning cable and/or coupling component undergoing disengagement. In particular versions, the harbor region 94 is accessible along a face of the tool 60, and also accessible from the receiving region 70. In the version of the decoupler tool 60 shown in FIGS. 21 and 22, the decoupler tool defines a front face 61, and an oppositely directed rear face 63. The harbor region 94 is accessible along the rear face 63. The primary pin 80 is disposed between the front and rear faces 61 and 63, respectively. And in particular versions, the cam face 90 is disposed between the primary pin 80 and the rear face 63 of the tool 60.

In certain versions of the decoupler tool 60, the harbor region 94 includes a straight guide which is generally in the shape of a U-shaped region defined by one or more guide walls 95 extending between the rear face 63 and a ledge 96. The harbor region 94 can also include an offset guide which is generally in the shape of a U-shaped region defined by one or more guide walls 97 extending between the ledge 96 and an end face 98. In particular versions of the decoupler tool 60 at least a portion of the guide wall 95 and/or the guide wall 97 extends at an angle parallel to or approximately the same as the angle of the cam face 90 taken with respect to axis S, i.e., from about 110° to about 160°, preferably from 120° to 150° and more particularly about 135°. However, it will be understood that the present subject matter includes embodiments in which the guide walls 95 and/or 97 or their portions are not parallel to the cam face 90.

The decoupler tool 60 is typically mounted or affixed to a drain cleaning machine or comparable larger equipment component. Such mounting or affixment can be by fastener(s) or welding, or other techniques.

The decoupler tool 60 is used to disengage a drain cleaning cable 2/coupling 5 from a mating component such as a cutter tool 3 or adjacent cable section as follows. A coupling assembly including a coupling 5 and a cutter tool 3 or other accessory as shown in the figures referenced herein, is positioned relative to the decoupler tool 60 so that the pin 80 is directed toward the engagement aperture 8 of the cutter tool 3. The coupling assembly is then positioned within the receiving region 70 of the decoupler tool 60 and the assembly aligned for insertion of the pin 80 in the engagement aperture 8 of the cutter tool 3. The coupling assembly is then urged toward the base 62. With such continued movement, the pin 80 is inserted into the engagement aperture 8 of the cutter tool 3, and the coupling 5 contacts the cam face 90 of the decoupler tool 60. With such further movement, as the coupling 5 contacts the cam face 90 and the pin 80 is inserted within the engagement opening 8 of the cutter tool 3, the plunger 6 is axially retracted as previously described, thereby allowing separation between the coupling 5 and the cutter tool 3. With continued urging of the coupling assembly toward the base 62 of the decoupler tool 60, the coupling 5 is received in the harbor region 94 and the cutter tool 3 is retained via insertion of the pin 80 in the engagement aperture 8.

The decoupler tool of this embodiment is configured such that the drain cleaning cable has two flat surfaces that slide within the guide walls 97 and/or 95 of the decoupler tool 60. A completely cylindrical coupling assembly would not function using this version of the stationary cable decoupler. The present subject matter includes stationary decoupler tools similar to the decoupler tool 60 but devoid of one or more of the harbor region 94, the straight guide having guide walls 95, and/or the offset guide having guide walls 97. In these versions, the decoupler tools can be used with coupling assemblies exhibiting a cylindrical shape.

A significant advantage of the cable decoupler tools of the present subject matter is efficiency gained by the operator during use. While valuable to all drain cleaning professionals, the decoupler tools of the present subject matter are particularly useful to sectional drain cleaning users that use cable couplings frequently and numerously during use when connecting the sections of drain cleaning cable together to reach the distance to the drain blockage. Gains in efficiency can be achieved when separating couplings without removal of the actuation hand from the tool. Additional advantages include faster sliding of the coupling sections apart compared to the currently known methods.

The present subject matter tools provide also greater leverage to the user to separate drain cleaning cable couplings. The large end of the decoupling tool provides greater surface contact area between the user's hand and the tool compared to currently known tools. This allows the user to more easily apply the required force to completely disengage the spring-actuated plunger from the coupling joint or connection. Further, the present subject matter provides leverage in sliding the two coupling components apart through normal twisting motion of the hand. This motion more smoothly separates the components as compared to gripping each side of the coupling joint and using direct application of lateral force(s) to separate the components. For at least these reasons, completing the cable coupling disconnection is achieved more easily than currently known methods and tools.

A common complaint of drain cleaning professionals is the frequency at which currently known key pins are lost on jobsites, carried off inadvertently in a user's pocket, or thrown out accidently with other components. When this occurs, the user must seek out a new tool or search extensively for a tool which has been lost. The tools of the present subject matter provide greater visibility when used or stored on the jobsite. This is at least partly because the tools are larger. A large shaped metal handle or polymeric handle can further improve visibility by using a brightly colored body to further stand out against the surroundings.

The molded handle of many of the decoupler tools described herein can provide a larger and more ergonomic contact point for the user when separating drain cleaning cable couplings. The handle can ease the occupational burden of releasing cable coupling sections repeatedly on a jobsite. Further, this handle allows better access and use of the tool when wearing gloves, common to drain cleaning professionals.

An optional feature of a key ring hole integrated into the body of the handle further reduces the likelihood of the tool being misplaced or lost on a jobsite as the tool can be tethered to another component, larger piece of equipment, or to the user.

The pins of the decoupler tools of the present subject matter can also be used by the operator to clean debris and remnants from the drain that have become intertwined into the cable. As noted, the decoupler tools can include a cleanout component. By inserting the pins or cleanout component through the cable windings, the user can push or pull the debris from the cable to aid in cleanliness of the retrieved cleaning cable.

The addition of a flat and/or hammer section of the handle provides a readily-accessible tool for the user to quickly verify that the spring-actuated plunger has properly engaged the mating coupling to ensure that inadvertent and undesirable separation of the coupling joint does not occur in the drain. Similarly, this feature can be used to help complete the coupling connection if/when binding occurs during installation of the two coupling components together. The user can tap on the coupling joint to help push the coupling components together or to a state of engagement.

Another advantage of the decoupler tools of the present subject matter using a conical shaped distal end of the first pin is the ability to insert the primary pin into the engagement aperture from nearly any angle. With the currently known key pin, the key pin can be inserted into the coupling joint in only a small range of rotational orientations to result in successful actuation of the plunger. With a tip that has a more uniform cross section, the user can extend the tip into the gap between the plunger and the coupling interior wall of the engagement aperture from various orientations, resulting in faster decoupling and minimized nuisance insertions that are impeded by the key pin contacting the blunt surface of the plunger rather than the distal end of the plunger.

For decoupler tools using an enlarged secondary pin for coupling separation, the possible inconvenience of inserting the wrong pin into the coupling assembly is eliminated, resulting in faster operation and eliminating the nuisance of improper pin insertion.

In still other versions of the decoupler tool, a total of three (3) pins are provided. Two primary pins and a single secondary pin are provided in a decoupler tool. The two primary pins differ in size and are adapted for separating coupling assemblies associated with different sizes of drain cleaning cable. The larger primary pin, larger diametrically and in length, is for use with larger cable sizes, for example, ⅞" and 1¼". The smaller primary pin, then, is for use with ⅝" drain cleaning cable for example. Each primary pin is configured specifically for the intended cable size with the diameter, length, and tip profile optimized for performance with the intended size. A single secondary pin resides between the two primary pins.

In all embodiments and versions of the decoupler tools described herein, the pins may exhibit a wide array of cross sectional shapes or configurations. Although in many applications, a circular cross section is typical, the present subject matter includes other shapes. A representative and non-limiting listing of such alternative shapes includes non-circular, oval, irregular, and polygonal in which the pin cross section consists of a total number of n sides, such that n is an integer within a range of from 1 to 10. In certain applications, n is 3 (i.e., a triangular cross section), 4 (i.e., a square cross section, or 6 (i.e., a hexagonal cross section).

With this version of the decoupler tool, the user positions the appropriate primary pin through the cable coupling to depress the spring-actuated plunger as described herein. The decoupler tool is then rotated to allow the secondary pin to contact the opposite side of the coupling assembly and rotated further through the connection to create separation of the couplings components. The function with either the small or large primary pin is the same to the user, and the common secondary pin creates the separation. As described herein, the secondary pin can be of larger diameter to prevent inadvertent placement of the pin into the spring-loaded plunger access hole or engagement aperture of the coupling component, e.g., a cutter tool.

Alternatively, the decoupling function of the tools can be achieved by mounting a separate primary pin/secondary pin couple at a different position on the decoupler tool. Likewise, rotating or sliding action of the second primary pin could be incorporated, as in a common multi-tool or pocket knife, to achieve the storage and positioning of the pins for use.

An advantage of this variation of the cable decoupler tool is improved efficiency and reduced complexity from allowing more functional uses of a single tool. By incorporating features for decoupling all sectional cable into a single tool, the end user does not need multiple, unique tools. This simplifies tool storage by reducing the number of tools kept, eliminates inadvertent attempted use of the wrong tool, and makes finding the right tool faster.

Having a common decoupler tool for all sectional cables and/or accessories also increases the volume of a single tool design entering the market since the number of user applications is greater; not every user would have previously purchased two separate tools. This greater volume will help reduce product cost.

The present subject matter also provides systems comprising the drain cleaning cables, coupling components, and tools or accessories combined with the decoupler tools described herein. For example, in one embodiment, a system for engaging and selectively disengaging a drain cleaning cable coupling and a mating component is provided. The system comprises a drain cleaning cable coupling and a mating component. The mating component includes provisions to radially and slidably engage the coupling assembly apart along opposing faces of the coupling and the mating component. The coupling includes an axially displaceable plunger biased to extend axially outward. The mating component defines an aperture that provides radial access or substantially so, to a distal end of the plunger upon engagement between the coupling and the mating component, and axial extension of the plunger. The system additionally comprises any of the decoupler tools described herein.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A decoupler tool comprising:

an elongated handle aligned with a first axis (B) and having a length and defining a second axis (C) disposed transverse to the first axis;

a first pin extending from the handle and aligned with the second axis (C), wherein the first pin has a distal end configured for insertion into an aperture of a first article of manufacture;

a second pin extending from the handle and spaced from the first pin;

wherein the first article of manufacture is operatively associated with a second article of manufacture; and wherein, with the first pin disposed in the aperture, rotation by a user of the handle about the second axis (C) to cause the first pin to engage a portion of the second article of manufacture causes the first and second articles of manufacture to disengage from each other;

wherein the distal end of the first pin is tapered;

wherein a distal end of the second pin has a different shape than that of the distal end of the first pin.

2. The decoupler tool of claim 1, wherein the second pin operatively engages an exterior surface portion of the second article of manufacture to cause the first and second articles of manufacture to disengage from each other.

3. The decoupler tool of claim 1, wherein the first pin and the second pin are spaced parallel to each another.

4. The decoupler tool of claim 1 wherein the distal end of the second pin is flat.

5. A method for using a decoupler tool (20) to disengage operatively associated first and second articles of manufacture (3, 5) from each other, wherein the decoupler tool (20) comprises:

an elongated handle (50) disposed along a first axis (B) and aligned with the first axis (B), wherein the handle (50) has a length and defines a second axis (C) disposed transverse to the first axis (B);

a first pin (30) extending from the handle (50) and disposed in the direction of the second axis (C) and aligned with the second axis (C), wherein the first pin has a distal end (32); and a second pin (40) extending from the handle (50) and spaced from the first pin (30);

wherein the method comprises:

inserting the distal end (32) of the first pin (30) into an aperture (8) of a first article of manufacture (3);

wherein the first article of manufacture is operatively associated with a second article of manufacture; and wherein, with the first pin disposed in the aperture, rotating the handle (50) about the second axis (C) to cause the first pin (30) to engage a portion of the second article of manufacture (5) to cause the first and second articles of manufacture (3, 5) to disengage from each other;

wherein the distal end of the first pin is tapered;

wherein a distal end of the second pin has a different shape that that of the distal end of the first pin.

6. A decoupler tool for selectively disengaging a cable coupling from a mating component, wherein the mating component defines an aperture, wherein the decoupler tool comprises a handle, a first pin extending from the handle and a second pin extending from the handle, wherein the cable coupling defines a first axis and includes a plunger having a distal end, wherein the plunger is biased for displacement of the distal end along the first axis relative to the mating component, wherein the coupling and the mating component each define respective opposing surface portions, wherein the surface portion of the mating component is configured and located to slidably engage the surface portion of the coupling, wherein the aperture is oriented along a second axis disposed transverse to the first axis and is configured for insertion of a distal end of the first pin into the aperture when the coupling is engaged with the mating component, and wherein the first pin is disposed along the second axis relative to the mating component for insertion of the first pin into the aperture, for selectively disengaging the coupling from the mating component;

wherein a distal end of the second pin has a different shape than that of the distal end of the first pin.

7. The decoupler tool of claim 6 wherein the distal end of the first pin is tapered.

8. The decoupler tool of claim 6, wherein the decoupler tool further comprises a tool body defining a tool face, and wherein the first pin and the second pin both extend from the tool face.

9. The decoupler tool of claim 8, wherein the first pin and the second pin both extend from the tool face parallel to each other.

10. The decoupler tool of claim 6, wherein the handle is disposed along an axis (B), and wherein the handle is oriented such that the axis (B) along which the handle is disposed is perpendicular to an axis (C) along which the first pin is disposed.

11. The decoupler tool of claim 6, wherein the second pin (40) has a length that is greater than a length of the first pin (30).

12. The decoupler tool of claim 6, wherein the second pin (40) has a cross sectional area greater than a cross sectional area of the first pin (30).

13. The decoupler tool of claim 6, wherein the handle defines at least one keychain aperture (56).

14. The decoupler tool of claim 6, wherein at least a portion of the handle is manufactured from a material selected from the group consisting of a polymeric material, a metal, and combinations thereof.

15. The decoupler tool of claim 8, wherein the tool body (24) includes an outwardly extending raised region.

16. The decoupler tool of claim 7, wherein the tapered distal end of the first pin (30) has a conical shape.

17. The decoupler tool of claim 6, further comprising: a third pin (45) extending from the handle (50).

18. The decoupler tool of claim 17, wherein the third pin (45) is of a length that is less than a length of the first pin (30).

19. The decoupler tool of claim 17, wherein the second pin (40) is disposed between the first pin (30) and the third pin (45).

20. The decoupler tool of claim 17, wherein a distal end (47) of the third pin (45) is tapered.

21. The decoupler tool of claim 6 wherein the distal end of the second pin is flat.

* * * * *